United States Patent [19]

Buathier et al.

[11] 4,007,254
[45] Feb. 8, 1977

[54] PROCESS FOR THE MANUFACTURE OF CARBON OXYSULFIDE

[75] Inventors: Bernard Buathier; Andre Combes; Francois Pierrot, all of Lyon; Henri Guerpillon, Saint-Cyr-Aumont d'Or, all of France

[73] Assignee: Rhone-Poulenc Industries, Paris, France

[22] Filed: Sept. 9, 1975

[21] Appl. No.: 611,705

[30] Foreign Application Priority Data

Sept. 11, 1974 France .............................. 74.31446

[52] U.S. Cl. .............................. 423/416; 423/443; 423/563
[51] Int. Cl.$^2$ ......................................... C01B 31/26
[58] Field of Search ........... 423/415, 416, 443, 563

[56] References Cited

UNITED STATES PATENTS 2,809,097  10/1957  Adcock et al. .................... 423/416
2,992,897  7/1961  Applegath et al. ................ 423/416

OTHER PUBLICATIONS

Mellor, "A Comprehensive Treatise on Inorganic & Theoretical Chemistry," Longmans, Green & Co., New York, N.Y., vol. 5, 1924, pp. 972 & 973.

Primary Examiner—Earl C. Thomas
Attorney, Agent, or Firm—Bacon & Thomas

[57] ABSTRACT

Carbon oxysulfide is obtained in high yield and with high product selectivity and conversion rates by the sulfurization of methanol in the gas phase at elevated temperatures. The starting methanol utilized in the process may be advantageously supplied from natural gas generated at petroleum production sites.

11 Claims, No Drawings

PROCESS FOR THE MANUFACTURE OF CARBON OXYSULFIDE

BACKGROUND OF THE INVENTION

The present invention relates to a process for the manufacture of carbon oxysulfide from methanol.

Carbon oxysulfide, also known as carbonyl sulfide, is a well known compound which has heretofore been used as an active reagent in various processes. For example, carbonyl sulfide is more reactive than carbon dioxide and has been suggested as a suitable reagent to react with ammonia in the synthesis of urea. Similarly, carbonyl sulfide is an excellent source of useable atomic sulfur and it has been used in the synthesis of sulfides from olefins, such as episulfides, alkenylthiols and vinylic thiols. Carbonyl sulfide also reacts with alcohols in the present of alkalis to form monothiocarbonates.

It is known that carbon oxysulfide is obtained whenever a mixture of carbon, oxygen and sulfur, or a mixture of compounds containing these elements, such as carbon monoxide, carbon disulfide and sulfur dioxide is heated to an elevated temperature. However, the preferred conventional methods of manufacturing this product essentially involve either the sulfurization of carbon monoxide by sulfur dioxide at a high temperature in the presence of carbon, or by sulfur in the presence of a catalyst, or the sulfurization of a mixture of hydrocarbons, air or $CO_2$ by sulfur, under elevated pressure and in the presence of a catalyst.

However, the recent difficulties in obtaining a continuous and adequate supply of hydrocarbons and the current energy crisis have forced industry to utilize certain starting materials which have hitherto been little used in the manufacture of chemical intermediates. As a consequence of present energy and economic conditions, the aforementioned conventional methods of producing carbon oxysulfide no longer constitute acceptable synthesis reactions.

Accordingly, the present invention is directed to a process for preparing carbon oxysulfide that does not require the use of relatively expensive hydrocarbon reactants which are in short supply or necessitate the utilization of carbon monoxide which due to its toxicity constantly presents a serious problem with respect to safety and processability.

SUMMARY OF THE INVENTION

It is, therefore, a primary object of the present invention to provide a process for preparing carbon oxysulfide which simultaneously avoids the problems associated with the heretofore known processes and effectively circumvents the added difficulties presently being encountered with such processes due to current energy and economic conditions.

A further object of the present invention is to provide an improved process for preparing carbon oxysulfide which is simple, effective and economical and which affords the desired product in high yield with excellent conversion rates and product selectivity.

The above and other objects are realized by the present invention which, essentially, provides a process for preparing carbon oxysulfide by the sulfurization of methanol.

Other objects and advantages of the present invention will become apparent from the ensuing detailed description.

DETAILED DESCRIPTION OF THE INVENTION

The present invention relates to a process for preparing carbon oxysulfide by the sulfurization of methanol in the gas phase at elevated temperatures and relatively short residence times.

In a preferred embodiment of the invention, the sulfurization reaction is effectuated at a temperature of between 500° and 800° C under an absolute pressure of between 0.5 and 5 bars and for a residence time ranging from 1 to 10 seconds. The foregoing comprise the optimum reaction conditions which promote sufficient conversion of methanol and high selectivity with respect to carbon oxysulfide. The upper and lower values are commensurate with economic or technological limitations and considerations only and, accordingly, the desired reaction may be carried out under conditions differing in one respect or another from the stated conditions so long as acceptable product yields, conversion rates and selectivity are obtained. For example, the temperature has been restricted to 800° C only to avoid excessive corrosion of the reactor apparatus.

The important feature of the present invention is that methanol is utilized as the carbon containing reactant instead of the carbon monoxide or hydrocarbon reactants of conventional processes. Methanol can be easily derived from natural gases generated at petroleum production sites and, accordingly, the present process is economically advantageous. It can be obtained, for example, by reacting synthesis gas containing hydrogen, carbon monoxide and carbon dioxide in the presence of a catalyst. Synthesis gas is produced by catalytically steam reforming a low cost hydrocarbon feedstock such as natural gas. (See Hydrocarbon Processing, November 1971, p.178 and 179). Moreover, since methanol is considerably less toxic than carbon monoxide and, therefore, more convenient to handle, the present process is distinctly advantageous from a processability standpoint.

The most advantageous conditions for the successful realization of the process of the invention are as follows:

The process is carried out at a temperature within the range of from about 600° to 700° C, under an absolute pressure close to atmospheric pressure. Under the foregoing conditions, a residence time of between about 2 and 5 seconds in the reactor is used.

In order to avoid the undesirable formation of ethane and at the same time improve the conversion of the methanol, an excess of free sulfur relative to the stoichiometry of the reaction is maintained. While there is no absolute upper limit, an excess of between 30 and 100% relative to the stoichiometric amount is preferably chosen so as to restrict the amount of unreacted sulfur which is to be condensed.

In practice, the reaction is carried out in the gas phase, in a reactor, constructed of corrosion-resistance materials such as, for example, corrosion-resistant steel. The sulfur, pre-heated to near the reaction temperature, and the methanol, pre-heated to between 120° and 150° C, are fed continuously into this reactor. Rapid and intimate mixing of the reagents at the feed is desirable to prevent any shortage of sulfur at any point in the reactor.

The gas discharged from the reactor which essentially consists of sulfur, hydrogen sulfide, carbon disulfide and carbon oxysulfide, is fed into a condenser where the unreacted sulfur is condensed, and then recycled. The last traces of sulfur are removed from the gases and the carbon oxysulfide, the carbon disulfide and the hydrogen sulfide are then separated in accordance with one of the methods conventionally employed, for example, by selective absorption of the sulfur and of the oxysulfide, followed by distillation which allows these two products to be readily separated.

The hydrogen sulfide can be converted to sulfur in accordance with known methods, such as, for example, the Claus process, or can be used as hydrogen sulfide in other manufacturing processes. The carbon disulfide by-product is itself valuable and after suitable purification it may be employed as a solvent in varnishes and lacquers, in soil disinfection, vacuum tube processing or any other conventional application. The carbon oxysulfide product can be subjected to additional purification processes.

One of the primary advantages of the instant process is that the degree of conversion of methanol approximates 100% and excellent yields of carbon oxysulfide are obtained.

The following non-limiting examples further illustrate the process according to the invention. In the examples the reactions are carried out at atmospheric pressure.

EXAMPLE 1

Sulfur and methanol, respectively pre-heated to 550 (reaction temperature) and to 130° C, are fed continuously into a reactor, the temperature of which is maintained at 550° C. The molar ratio of sulfur/methanol is 4.5, which corresponds to a 50% excess of free sulfur relative to the stoichiometric amount required for the reaction. The average residence time is 4.7 seconds. The total duration of the reaction is 7 hours.

Under these conditions, the following results were obtained:

| Under these conditions, the following results were obtained: | |
| --- | --- |
| Degree of conversion relative to carbon | 51.4 % |
| Selectivity of the converson: | |
| with respect to carbon oxysulfide | 77 % |
| with respect to carbon disulfide | 21 % |

It is noted that the relatively low temperature restricts the conversion of the methanol.

EXAMPLE 2

The reactants, pre-heated in the same manner as in Example 1, are fed continuously into a reactor the temperature of which is maintained at 600° C. The molar ratio of S/CH$_3$OH is 4.7, which corresponds to a 56.5% excess of free sulfur relative to the amount required by the stoichiometry of the reaction.

The average residence time is 4.7 seconds. The total duration of the reaction is 10 hours.

The foregoing reaction conditions gave the following results:

| The foregoing reaction conditions gave the following results: | |
| --- | --- |
| Degree of conversion relative to carbon | 98 % |
| Selectivity of the conversion: | |
| with respect to carbon oxysulfide | 89.2 % |
| with respect to carbon disulfide | 10.5 % |

EXAMPLE 3

The reactants, preheated in the same manner as in Example 1, are fed continuously into a reactor the temperature of which is maintained at 700° C. The molar ratio of S/CH$_3$OH is 4.9, which corresponds to a 63.3% excess of free sulfur relative to the amount required by the stoechiometry of the reaction. The average residence time is 1.5 seconds; the total duration of the reaction is 8 hours.

The foregoing reaction conditions gave the following results:

| The foregoing reaction conditions gave the following results: | |
| --- | --- |
| Degree of conversion relative to carbon | 100 % |
| Selectivity of the conversion: | |
| with respect to carbon oxysulfide | 64.5 % |
| with respect to carbon disulfide | 6.0 % |
| with respect to ethane | 29.4 % |

EXAMPLE 4

Using the same reaction temperature as that set forth in Example 3, but an average residence time of 2.2 seconds and a molar ratio of S/CH$_3$OH of 5.2, which corresponds to 73.5% excess free sulfur relative to the amount required by the stoichiometry of the reaction, the following results were obtained in the course of the reaction the total duration of which is 8 hours 30 minutes:

| Degree of conversion relative to carbon | 99% |
| --- | --- |
| Selectivity of the conversion: | |
| with respect to carbon oxysulfide | 91.5% |
| with respect to carbon disulfide | 7.9 % |

Comparing the above results with those of Example 3, it is noted that for a given reaction temperature, a larger excess of free sulfur and an increase in the average residence time in the reactor prevents the formation of ethane.

While the invention has been described with reference to preferred embodiments thereof, it is to be expressly understood that various changes, modifications and/or substitutions may be made therein without departing from the spirit and scope thereof. It is the intention, therefore, that the invention be limited only by the scope of the appended claims.

What is claimed is:

1. A process for preparing carbon oxysulfide comprising reacting free sulfur and methanol in the gas phase at a temperature ranging from between about 500° and 800° C.

2. The process as defined by claim 1, wherein said sulfurization is carried out at a residence time of between about 1 and 10 seconds.

3. The process as defined by claim 1, wherein the sulfur reactant is present in an amount ranging between about 30 to 100% relative to the amount of free sulfur required by the stoichiometry of the reaction.

4. The process as defined by claim 1, wherein the reaction temperature is between about 600° and 700° C.

5. The process as defined by claim 1, wherein the reactant residence time is between about 2 and 5 seconds.

6. The process as defined by claim 1, wherein the sulfurization is carried out at a pressure between about 0.5 and 5 bars.

7. The process as defined by claim 6, wherein the pressure is atmospheric pressure.

8. The process as defined by claim 1, wherein said sulfur reactant is pre-heated to reaction temperature and said methanol is pre-heated to between about 120° and 150° C prior to being fed into the reaction system.

9. The process as defined by claim 1, wherein the sulfurization reaction is carried out over a period between about 7 and 10 hours.

10. The process as defined by claim 1, wherein carbon disulfide is byproduced in the sulfurization reaction.

11. The process as defined by claim 1, wherein unreacted sulfur is condensed and recycled to the sulfurization reaction.

* * * * *